United States Patent
Kim et al.

(10) Patent No.: US 8,014,368 B2
(45) Date of Patent: Sep. 6, 2011

(54) GATEWAY FOR INTERCONNECTING AD-HOC NETWORK AND INFRASTRUCTURE NETWORK, AND METHODS FOR DISCOVERING AND REGISTERING SERVICE PROVIDER USING GATEWAY

(75) Inventors: Jae-hoon Kim, Seoul (KR); Kyung-lim Kang, Suwon-si (KR); Jung-ho Kim, Suwon-si (KR); Yong-sung Roh, Icheon-si (KR); Singh Shubhranshu, Yongin-si (KR); Young-gon Choi, Suwon-si (KR); Chang-seok Oh, Cheongju-si (KR); Sung-hee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1344 days.

(21) Appl. No.: 11/334,479

(22) Filed: Jan. 19, 2006

(65) Prior Publication Data
US 2006/0171403 A1    Aug. 3, 2006

(30) Foreign Application Priority Data

Feb. 1, 2005    (KR) .......................... 10-2005-0009080

(51) Int. Cl.
*H04W 4/00* (2009.01)
*H04J 4/00* (2006.01)
(52) U.S. Cl. ........................................ 370/338; 370/436
(58) Field of Classification Search .................. 370/328, 370/338, 401; 455/436, 439
See application file for complete search history.

(56) References Cited

U.S. PATENT DOCUMENTS

| | | | | |
|---|---|---|---|---|
| 2001/0024443 | A1* | 9/2001 | Alriksson et al. | 370/401 |
| 2002/0058502 | A1* | 5/2002 | Stanforth | 455/422 |
| 2004/0125776 | A1* | 7/2004 | Haugli et al. | 370/338 |
| 2004/0125778 | A1* | 7/2004 | Lin et al. | 370/338 |
| 2004/0174904 | A1* | 9/2004 | Kim et al. | 370/475 |
| 2004/0190468 | A1* | 9/2004 | Saijonmaa | 370/312 |
| 2004/0203611 | A1* | 10/2004 | Laporta et al. | 455/412.1 |
| 2004/0240474 | A1* | 12/2004 | Fan | 370/475 |
| 2005/0153725 | A1* | 7/2005 | Naghian et al. | 455/520 |

(Continued)

OTHER PUBLICATIONS

Engelstad, Paal, "Internet Connectivity for Multi-Homed Proactive Ad Hoc Networks," Jun. 24, 2004, 2004 IEEE International Conference on Communications, vol. 7, p. 4050-4056.*

(Continued)

*Primary Examiner* — Dang T Ton
*Assistant Examiner* — Ryan C Kavleski
(74) *Attorney, Agent, or Firm* — Sughrue Mion, PLLC (57) ABSTRACT

A service provider discovery method in a wireless network environment, includes receiving, by the gateway, a service request (SREQ) packet which is broadcast from a first mobile node in the ad-hoc network; updating and transmitting, by the gateway, the SREQ packet to a service repository which stores at least one service provider information, in the infrastructure network; transmitting, by the service repository, a service reply (SREP) packet containing information relating to a service provider which provides a service requested by the SREQ packet to the gateway, and updating and transmitting, by the gateway, the SREP packet to the first mobile node. Accordingly, the service can be used in association with the ad-hoc network and the infrastructure network.

19 Claims, 10 Drawing Sheets

U.S. PATENT DOCUMENTS

| | | | |
|---|---|---|---|
| 2005/0176449 A1* | 8/2005 | Cui et al. | 455/466 |
| 2005/0239438 A1* | 10/2005 | Naghian | 455/410 |
| 2005/0254472 A1* | 11/2005 | Roh et al. | 370/338 |
| 2006/0002328 A1* | 1/2006 | Naghian | 370/328 |
| 2006/0092898 A1* | 5/2006 | Kim et al. | 370/338 |
| 2006/0094456 A1* | 5/2006 | Rittle et al. | 455/519 |
| 2007/0121667 A1* | 5/2007 | Hare et al. | 370/462 |
| 2007/0249331 A1* | 10/2007 | Sinivaara et al. | 455/418 |

OTHER PUBLICATIONS

Yuan-Ying Hsu, "Design and Implementation of Two-tier Mobile Ad Hoc Networks with Seamless Roaming and Load-balancing Routing Capability," Oct. 20, 2004, First International Conference on Quality of Service in Heterogeneous Wired/Wireless Networks, p. 52-58.*

UC Kozat, "Network Layer Support for Service Discovery in Mobile Ad Hoc Networks," Mar. 30, 2003, IEEE Socieites INFOCOM 2003, Volumn 3, pp. 1965-1975.*

* cited by examiner

DAD Packet :

| 0 | 1 | 2 | 3 | 4 | |
|---|---|---|---|---|---|
| Ver = 6 | Traffic Class | Flow Label | | | IPv6 Header [RFC2460] |
| Payload Length | | NH = 58 (ICMPv6) | Hop Limit | | |
| Source Address<br>Site-local temporary Address for DAD<br>MANET_INITAL_PREFIX(fec0:0000:0000:ffff::/96) | | | | | |
| Destination Address<br>All-nodes multicast address(ff05:ffff::/64) | | | | | |
| Type = 135 | Code = 0 | Checksum | | | ICMPv6 [RFC 1885] |
| M | Reserved | | | | |
| Requested IPv6 Address<br>IP Address of Service Provider | | | | | Neighbor Discovery [RFC 2461] |
| Lifetime | | Length of URL | | | URL based Service Information from SLP [RFC 2165] |
| <URL><br>variable length | | | | | |
| Length of ATTr-list | | <Attr-list> | | | |
| <Attr-list><br>variable length | | | | | |

711 = IPv6 Header rows; 712 = ICMPv6/Neighbor Discovery rows; 713 = URL based Service Information rows

FIG. 7B

Service Registration Message :

| 0 | 1 | 2 | 3 | 4 | |
|---|---|---|---|---|---|
| Ver = 6 | Traffic Class | Flow Label | | | IPv6 Header [RFC2460] |
| Payload Length | | NH = 17 (UDP) | Hop Limit | | |
| Source Address<br>IP Address of Internet Gateway | | | | | |
| Destination Address<br>IP Address of Directory Agent (Service Repository) | | | | | |
| Source Port # | | Destination Port # = 427 | | | UDP Header |
| Length | | Checksum | | | |
| Version | Function = 3 (SrvReg) | Length | | | Service Location Header |
| OMUAF | Reserved | Dialect | Language Code | | |
| Char Encoding | | Transaction Identifier (XID) | | | |
| Lifetime | | Length of URL | | | URL based Service Information from SLP [RFC 2165] |
| <URL><br>variable length | | | | | |
| Length of ATTr-list | | <Attr-list> | | | |
| <Attr-list><br>variable length | | | | | |

< Service Registration Message of SLP >

FIG. 8A

Service Request Message :

| Ver = 6 | Traffic Class | Flow Label | | |
|---|---|---|---|---|
| Payload Length | | NH = 17 (UDP) | Hop Limit | IPv6 Header [RFC2460] |
| Source Address (IP Address of Forwarding Node) | | | | |
| Destination Address All-nodes multicast address(ff05:ffff::/64) | | | | |
| Source Port # | | Destination Port # | | UDP Header |
| Length | | Checksum | | |
| Type | JRGI | Reserved | Hop Count | |
| Flooding ID | | | | |
| 32-bit destination sequence number | | | | |
| 32-bit source sequence number | | | | RREQ |
| Source IP Address IP Address of Service Requester | | | | |
| Destination IP Address (Ignored) | | | | |
| Length of predicate string | | Service Request <Predicate> | | Service Request <Predicate> |
| Service Request <Predicate>. contd. variable length | | | | |

811 = IPv6 Header section
812 = RREQ section

<SREQ(Service REQuest) Message>

FIG. 8B

Service Request Message :

| Ver = 6 | Traffic Class | Flow Label | | |
|---|---|---|---|---|
| Payload Length | | NH = 17 (UDP) | Hop Limit | IPv6 Header [RFC2460] |
| Source Address IP Address of Internet Gateway | | | | |
| Destination Address IP Address of Directory Agent (Service Repository) | | | | |
| Source Port # | | Destination Port # = 427 | | UDP Header |
| Length | | Checksum | | |
| Version | Function = 1 (SrvReg) | Length | | Service Location Header |
| OMUAF | Reserved | Dialect | Language Code | |
| Char Encoding | | Transaction Identifier (XID) | | |
| Length of previous predicate string = 0 | | Length of redicate string | | Service Request |
| Service Request <Predicate> variable length | | | | |

821 = IPv6/UDP/Service Location Header section
822 = Service Request section

<Service Request Message of SLP>

FIG. 9A

Service Reply Message :

| 0 | 1 | 2 | 3 | 4 | |
|---|---|---|---|---|---|
| Ver = 6 | Traffic Class | Flow Label | | | IPv6 Header [RFC2460] |
| Payload Length | | NH = 17 (UDP) | Hop Limit | | |
| Source Address<br>IP Address of Internet Gateway | | | | | |
| Destination Address<br>IP Address of Directory Agent (Service Repository) | | | | | |
| Source Port # | | Destination Port # = 427 | | | UDP Header |
| Length | | Checksum | | | |
| Version | Function = 1 (SrvReg) | Length | | | Service Location Header |
| OMUAF | Reserved | Dialect | Language Code | | |
| Char Encoding | | Transaction Identifier (XID) | | | |
| Error Code | | URL Entry Count | | | |
| <URL Entry 1>... | | | | | Service Reply <URL> |
| ⋮ | | | | | |
| <URL Entry N>... | | | | | |

911 brackets the IPv6 Header through Service Location Header.
912 brackets the Service Reply <URL> section.

<Service Reply Message of SLP>

FIG. 9B

SREP Message :

<SREQ(Service REPly) Message>

GATEWAY FOR INTERCONNECTING AD-HOC NETWORK AND INFRASTRUCTURE NETWORK, AND METHODS FOR DISCOVERING AND REGISTERING SERVICE PROVIDER USING GATEWAY

CROSS-REFERENCE TO RELATED APPLICATIONS

This application claims the benefit of priority under 35 U.S.C. §119 (a) from Korean Patent Application No. 2005-0009080 filed on Feb. 1, 2005 in the Korean Intellectual Property Office, the entire disclosure of which is incorporated herein by reference.

BACKGROUND OF THE INVENTION

1. Field of the Invention

The present invention generally relates to a gateway for interconnecting an ad-hoc network and an infrastructure network and methods for discovering and registering a service provider using the gateway. More particularly, the present invention relates to a gateway which discovers a requested service in an ad-hoc network or an infrastructure network upon receiving the service request and methods for discovering and registering a service provider using the gateway.

2. Description of the Related Art

With the advance of communication technologies, not only wired networks but also wireless networks are established and are in use. The wireless network environment can be divided into an infrastructure network and an ad-hoc network.

The infrastructure network is a communication network that uses access points. The access points relay communications between terminal devices that operate in the infrastructure mode.

The ad-hoc network is a communication network where a plurality of terminal devices independently resides in a space and performs one-to-one communication with devices within their recognizable range. A terminal device operating in the ad-hoc mode can act as a server or a client.

It is possible to variously implement the type of terminal devices in the infrastructure network or the ad-hoc network, respectively. For example, devices, such as general desktop personal computer, notebook computers, printers, facsimile machines, mobile phones, and personal digital assistants (PDAs), can establish the wireless network environment. Each terminal device provides a specific service. For instance, a printer provides a printing service, and a facsimile machine provides a fax service.

Meanwhile, there is a difference between the infrastructure network and the ad-hoc network with respect to how to use the services provided from the terminal devices connected to the respective networks due to network characteristics.

Specifically, in the infrastructure network, service information provided from the terminal devices is integrated and managed using a service repository. To manage service information, the service repository pre-stores a lookup table which records information relating to an address and a service of each terminal device. In further detail, upon receiving a service request (SREQ) packet from a certain terminal device, the service repository responds with a replay packet containing information relating to a terminal device which provides the requested service, that is, a service provider by referring to the lookup table. The terminal device, upon receiving the reply packet, is provided with the service by communicating with the service provider.

By contrast, in the ad-hoc network, each mobile node provides service using a peer-to-peer communication. In specific, a mobile node that requests service, that is, a service requester broadcasts a SREQ packet over a certain range. If a mobile node providing the requested service is present amongst neighboring mobile nodes that receive the broadcast SREQ packet, the mobile node, that is, a service provider sends a reply packet to the service requester. Alternatively, if the mobile node receiving the SREQ packet holds information relating to the service provider, the mobile node sends a reply packet containing the information relating to the service provider, to the service requester. Hence, the service requester can be provided with the service from the service provider.

As discussed above, the service delivery system differs according to the infrastructure network and the ad-hoc network. As a result, the mobile node communicating in the ad-hoc mode cannot use the service provided from the node communicating in the infrastructure mode, and vice versa. Thus, the service availability is deteriorated in the environment established with various terminal devices.

SUMMARY OF THE INVENTION

An aspect of the present invention is to address the above-mentioned and other problems and disadvantages occurring in the conventional arrangement, and to provide a gateway which discovers a service provider, when a service request is received from a mobile node, that provides the requested service in the ad-hoc network and the infrastructure network and notifies the service requester of the service provider. Another aspect of the present invention is to provide methods for discovering and registering the service provider using the gateway.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

To accomplish the above and other aspects of the present invention, a service provider discovery method in a wireless network environment that includes an infrastructure network and a gateway connecting to an ad-hoc network is provided. The method includes receiving, by the gateway, a service request (SREQ) packet which is broadcast from a first mobile node in the ad-hoc network; updating and transmitting, by the gateway, the SREQ packet to a service repository which stores at least one service provider information, in the infrastructure network; transmitting to the gateway, by the service repository, a service reply (SREP) packet containing information relating to a service provider which provides a service requested by the SREQ packet; and updating and transmitting, by the gateway, the SREP packet to the first mobile node.

The service provider discovery method may further include joining, by a mobile node providing a service, the ad-hoc network; generating, by the mobile node, a duplicate address detection (DAD) packet containing information of the service and transmitting the DAD packet to the gateway; checking, by the gateway, whether an address and the service information of the mobile node are novel; transmitting, by the gateway, a registration request packet in which the address and the service information of the mobile node are recorded, to the service repository when at least one of the address and the service information of the mobile node is novel; and registering, by the service repository, the information relating to the mobile node and the service to a lookup table that stores the service provider information.

The service provider discovery method may further include generating, by each mobile node in the ad-hoc network, an information request packet to maintain a communication link to the gateway; recording, by the each mobile node, update information relating to a service provided from the each mobile node to the information request packet; transmitting the information request packet to the gateway in a cycle; transmitting, by the gateway, the update information recorded in the information request packet received from the each mobile node, to the service repository; and updating, by the service repository, the lookup table using the update information.

The service provider discovery method may further include setting the transmission cycle of the information request packet in inverse proportion to a frequency of service use provided from the each mobile node and in proportion to a communication link stability of the each mobile node.

The service provider discovery method may further include defining, by the first mobile node, a communication distance to the gateway to a maximum broadcast range and broadcasting the SREQ packet within the maximum broadcast range.

The service provider discovery method may further include searching, by the gateway, a second mobile node which provides the service requested by the SREQ packet in the ad-hoc network; transmitting the SREQ packet to the second mobile node when the second mobile node is discovered; and transmitting, by the second mobile node, a SREP packet to the first mobile node.

The service provider discovery method may further include broadcasting, by the gateway, a SREQ packet requesting a first service throughout the ad-hoc network when the first service is requested from a terminal device in the infrastructure network.

The service provider discovery method may further include searching, by the gateway, a service provider that provides a first service in the ad-hoc network when the first service is requested from a terminal device in the infrastructure network.

A service provider registration method of a service repository that stores a lookup table in which information of at least one service provider information, in an infrastructure network connected to an ad-hoc network through a gateway is provided. The method includes joining, by a mobile node providing a service, the ad-hoc network; generating, by the mobile node, a duplicate address detection (DAD) packet containing information relating to the service and transmitting the DAD packet to the gateway; checking, by the gateway, whether an address and the service information of the mobile node are novel; transmitting, by the gateway, to the service repository a registration request packet in which the address and the service information of the mobile node are recorded, when at least one of the address and the service information of the mobile node is novel; and registering to a lookup table, by the service repository, the information relating to the mobile node and the service.

The service provider registration method may further include transmitting, by each mobile node in the ad-hoc network, an information request packet in which update information relating to a service provided by each mobile node is included, to the gateway in a cycle; transmitting, by the gateway, the update information to the service repository; and updating, by the service repository, the lookup table using the update information.

A gateway which interconnects an ad-hoc network and an infrastructure network is provided. The gateway includes a memory storing a routing table in which communication path information with respect to each mobile node in the ad-hoc network and service information provided from the each mobile node; a communication section receiving a service request packet (SREQ) packet from a first mobile node in the ad-hoc network; a search section discovering a service provider which provides a service requested by the SREQ packet, in the ad-hoc network using the routing table; a packet processor updating the SREQ packet according to a protocol used in the infrastructure network; and a controller controlling the communication section to transmit the packet converted by the packet processor to a service repository in the infrastructure network when a determination is made that the service provider is not in the ad-hoc network.

The controller, when a service reply packet (SREP) packet is received from the service repository, may control the packet processor and the communication section to update the SREP packet according to a protocol used in the ad-hoc network and to transmit the updated packet to the first mobile node.

The controller, when the search section discovers the service provider, may forward the SREQ packet to the service provider.

The controller, when a duplicate address detection (DAD) packet in which address information and service information are recorded is received from a second mobile node joining the ad-hoc network, may register the second mobile node to the service repository by controlling the communication section to transmit to the service repository a registration request packet in which the address information and the service information are recorded.

The controller, each time an information request packet to which update information relating to a service provided from each mobile node is appended is received from the each mobile node in the ad-hoc network, may control the communication section to transmit to the service repository a packet in which the update information is recorded.

The controller, when a SREQ packet is received from a terminal device in the infrastructure network, may control the packet processor and the communication section to update the SREQ packet and to broadcast the updated packet throughout the ad-hoc network.

The controller, when a SREQ packet is received from a terminal device in the infrastructure network, may control the packet processor and the communication section to update the SREQ packet and to forward the updated packet to the discovered service provider.

BRIEF DESCRIPTION OF THE DRAWING FIGURES

These and/or other aspects of the present invention will become apparent and more readily appreciated from the following description of exemplary embodiments, taken in conjunction with the accompanying drawing figures, in which.

DETAILED DESCRIPTION OF THE EXEMPLARY EMBODIMENT

Certain exemplary, non-limiting embodiments of the present invention will now be described in greater detail with reference to the accompanying drawings.

In the following description, same drawing reference numerals and characters are used to denote analogous elements even in different drawings. The matters defined in the description, such as detailed construction and element descriptions, are provided to assist in a comprehensive understanding of the invention and not by way of a limitation. Also, well-known functions or constructions are not described in detail since they would obscure exemplary embodiments of the present invention in unnecessary detail.

Figure 1:
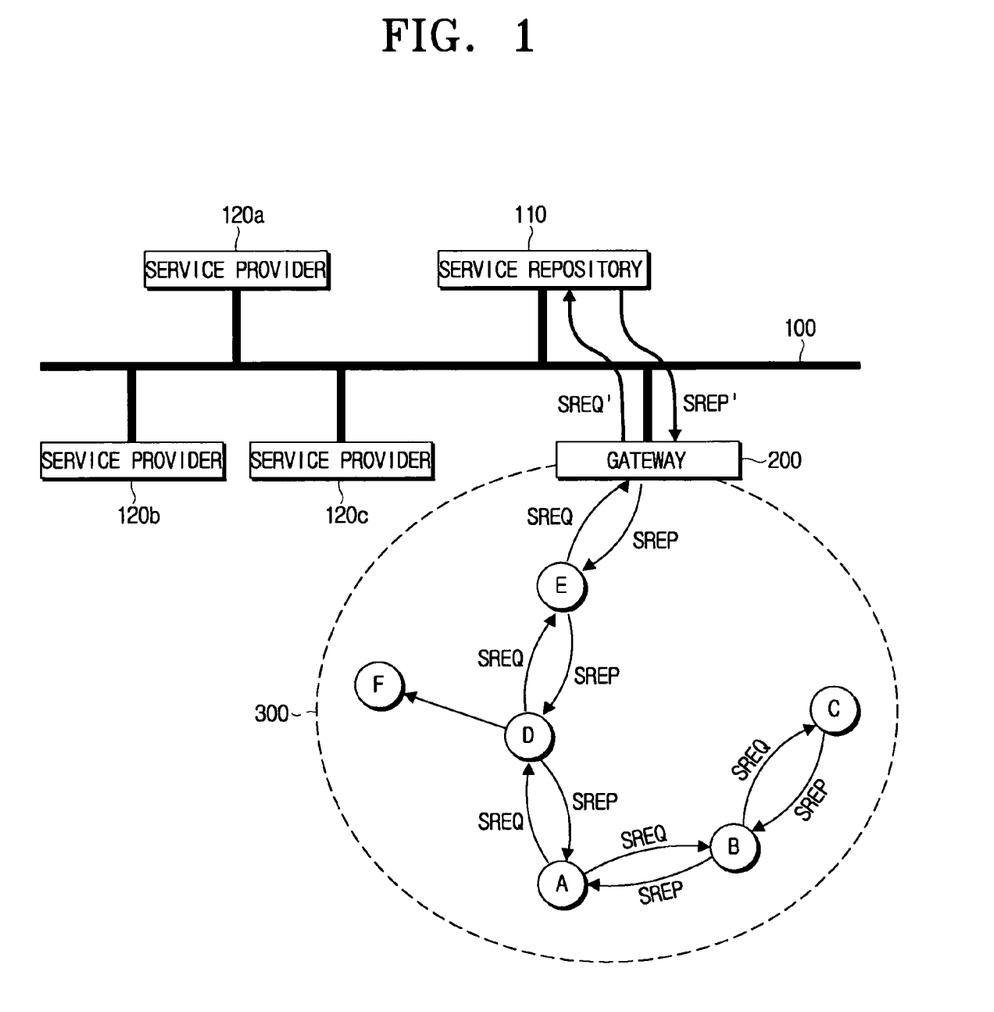
FIG. 1 illustrates the structure of a wireless network environment according to an exemplary, non-limiting embodiment of the present invention.

FIG. 1 illustrates a wireless network environment according to an exemplary embodiment of the present invention. Referring to FIG. 1, the wireless network environment includes an infrastructure network 100, a gateway 200, and an ad-hoc network 300. The infrastructure network 100 is linked to a service repository 110 and a plurality of service providers 120a, 120b, and 120c by wired or wireless connection. The service repository 110 stores a lookup table which records address information, service class information, communication port numbers, and uniform resource locators (URLs) of the plurality of service providers 120a, 120b, and 120c. The ad-hoc network 300 includes a plurality of mobile nodes A through F that communicate in an ad-hoc mode. Although FIG. 1 depicts only six mobile nodes as an example, the number of mobile nodes is not limited to this number.

With the structure depicted in FIG. 1, a certain mobile node in the ad-hoc network 300 broadcasts a service request (SREQ) packet to request a service of a certain class. A neighbor mobile node receiving the broadcast SREQ packet determines whether it can provide the requested service or whether it caches information relating to the service provider in the ad-hoc network 300. When the neighbor mobile node is the service provider or caches the information relating to the service provider, the neighbor mobile node sends a service reply (SREP) packet to the service requester immediately. By contrast, when the neighbor mobile node can not provide the requested service nor cache the information relating to the service provider, the neighbor mobile node rebroadcasts the SREQ packet By way of an example, in FIG. 1, the mobile node A is the service requester. When the mobile node A broadcasts the SREQ packet, the mobile nodes B and D receive the broadcast packet. The mobile node D rebroadcasts the SREQ packet to the mobile nodes E and F, and the mobile node E forwards the SREQ packet to the gateway 200. Upon receiving the SREQ packet, the gateway 200 updates and transmits the SREQ packet to the service repository 110. The service repository 110 refers to its pre-stored lookup table. The lookup table stores various information as to the service providers 120a through 120c. In case that the service provider 120b provides the service requested by the mobile node A, the service repository 110 transmits to the gateway 200 a SREP packet which contains the address of the service provider 120b and the information regarding the communication path to the service provider 120b. After updating the SREP packet, the gateway 200 forwards the updated SREP packet to the mobile node A along the transmission path of the SREQ packet. Hence, the mobile node A can request the service of the certain service provider and enjoy the intended service. As described above with reference to FIG. 1, the gateway 200 interconnects the infrastructure network 100 and the ad-hoc network 300. Formats of the SREQ packet and the SREP packet will be described later in detail.

In case that the mobile node B receives the SREQ packet in FIG. 1, the mobile node B broadcasts the SREQ packet toward the mobile node C. If the mobile node C is the service provider, the mobile node C sends a SREP packet to the mobile node A via the mobile node B. When the mobile node B caches information relating to the mobile node C, the mobile node B forwards the SREP packet directly to the mobile node A.

A new mobile node may join the ad-hoc network 300. In this situation, the new mobile node, typically, performs duplicate address detection (DAD) by broadcasting a DAD packet containing its address over the ad-hoc network 300. According to an exemplary embodiment of the present invention, a new mobile node broadcasts the DAD packet by appending its providing service information to the DAD packet. Upon receiving the DAD packet, the gateway 200 determines whether there is a duplicate address by looking up a routing table where information relating to the communication paths to the mobile nodes in the ad-hoc network 300 is recorded. The routing table additionally holds information relating to the services provided from the mobile nodes A through F. Accordingly, the gateway 200 determines whether a relevant mobile node provides a new service by checking the service information stored in the routing table. While determining the novelty of the address of the new mobile node, the gateway 200 transmits a gateway advertisement packet to the new mobile node. The new mobile node, receiving the gateway advertisement packet, can establish a communication path to the gateway 200.

When determining the novel address or the novel service, the gateway 200 records the novel address and/or service information into the routing table. Next, the gateway 200 transmits, to the service repository 110, a registration request packet in which the address and the service information of the new mobile node are recorded. The service repository 110 records and registers the received address information and service information to its lookup table.

Figure 2:
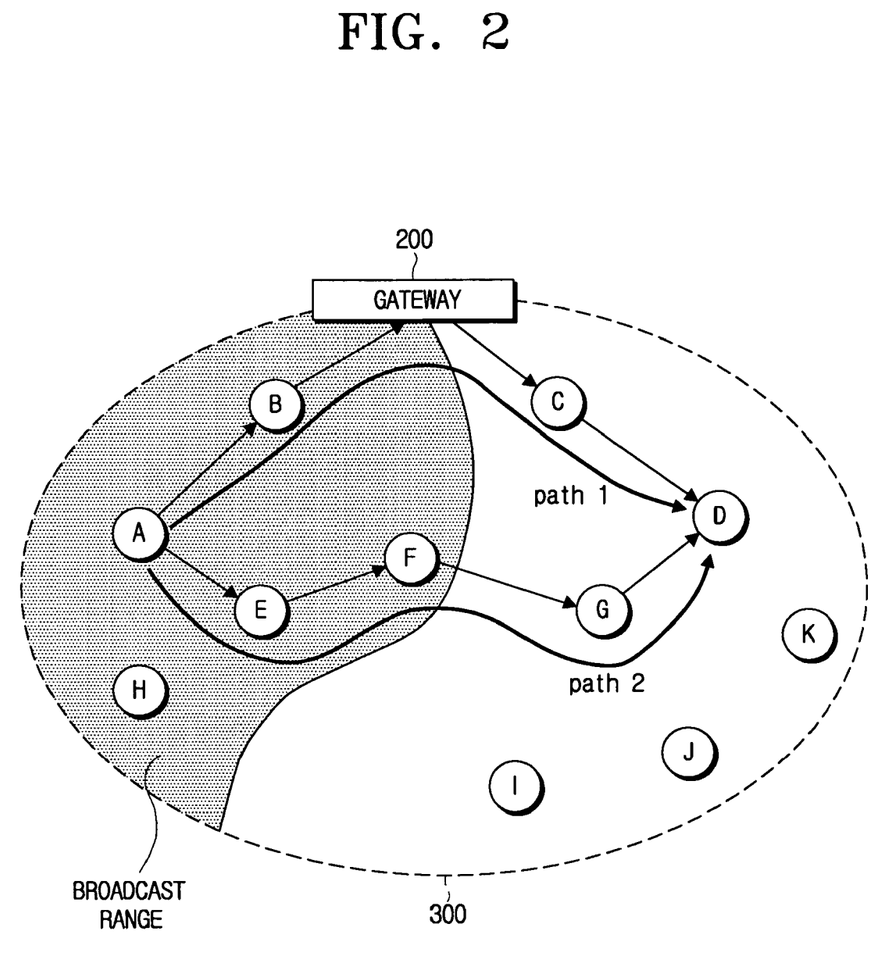
FIG. 2 illustrates how to discover a service provider in the wireless network environment according to an exemplary embodiment of the present invention.

FIG. 2 illustrates a service provider discovery method in the wireless network environment according to an exemplary embodiment of the present invention. Referring to FIG. 2, the mobile node A is a service requester. The mobile node A broadcasts a SREQ packet within a specific broadcast range.

In the related art, the service requester generally broadcasts the SREQ packet all over the ad-hoc network 300 in order to discover the service provider within the ad-hoc network 300. However, this conventional method causes severe power waste of the service requester.

According to an exemplary embodiment of the present invention and as depicted in FIG. 2, the gateway 200 records not only the address information but also the service information during the registration procedure of the respective mobile nodes. Thus, once the SREQ packet is broadcast as far as the gateway 200, the gateway 200 can search a service provider using the information recorded in the routing table. When the service provider is discovered, the gateway 200 forwards the SREQ packet to the service provider. Since the broadcast range is reduced, the power waste can be avoided.

The broadcast range can be defined based on a communication distance to the gateway 200. Specifically, the mobile node A determines a maximum hop count using the number of mobile nodes residing along the communication path to the gateway 200. As the gateway 200 is reachable via the mobile node B as shown in FIG. 2, the maximum hop count is set to two. Accordingly, the SREQ packet broadcasted by the mobile node A can be received by the mobile nodes B, E, F, and H, and the gateway 200. When the service provider is the mobile node D, the gateway 200 forwards the SREQ packet to the mobile node D.

In case that the service provider is located farther than the gateway 200, there is no big difference between the direct path to the service provider and the path via the gateway 200. That is, in FIG. 2, the SREQ packet broadcast by the mobile node A can be delivered to the mobile node D along a first path which passes through the mobile node B, the gateway 200, and the mobile node C. When the first path is compared with a second path which passes through the mobile node E, the mobile node F, and the mobile node G, the hop count along the communications paths is identical.

It is preferred that each mobile node periodically transmits an information request packet to maintain the communication link to the gateway 200. At this time, each mobile node can append update information of the providing service to the information request packet. The gateway 200, upon receiving the update information, notifies the service repository 110 so as to update the lookup table. Meanwhile, frequent transmissions of the update information may cause overhead on the communication path. Hence, it is preferred that the transmission cycle of the update information of each mobile node is in inverse proportion to the frequency of the service use and in proportion to the communication link stability. In other words, a mobile node having a low frequency of service use can extend the transmission cycle of the update information, and a mobile node having low communication link stability can shorten the transmission cycle of the update information.

Figure 3:
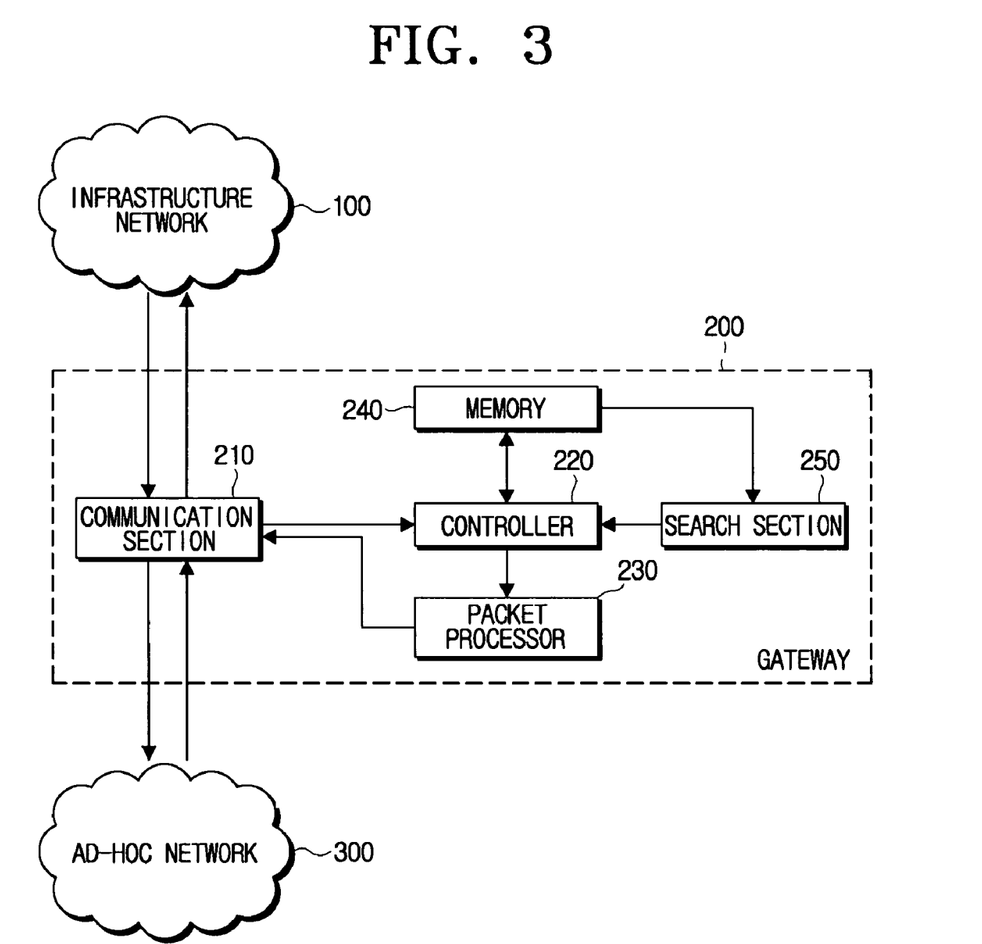
FIG. 3 is a block diagram of a gateway according to an exemplary embodiment of the present invention.

FIG. 3 is a block diagram of the gateway 200 according to an exemplary embodiment of the present invention. As shown in FIG. 3, the gateway 200 includes a communication section 210, a controller 220, a packet processor 230, a memory 240, and a search section 250.

The communication section 210 is responsible to communicate with devices over the ad-hoc network 300 and the infrastructure network 100.

The controller 220 controls operations of the components of the gateway 200 by checking a packet received through the communication section 210.

The packet processor 230 updates a packet received from the ad-hoc network 300 and the infrastructure network 100.

The memory 240 stores a routing table where information relating to the communication paths to the mobile nodes, which transmit and receive data through the communication section 210, in the ad-hoc network 300 is recorded. Service information of the mobile nodes is also recorded in the routing table in addition to information relating to the intermediate nodes in the communication paths.

The search section 250 searches a service provider over the ad-hoc network 300 using the routing table stored in the memory 240.

Hereafter, the operations of the gateway 200 are explained. If a new mobile node joins the ad-hoc network 300 and broadcasts a DAD packet, the communication section 210 receives the DAD packet. The DAD packet contains not only the address information but also the service information of the new mobile node.

The controller 220 determines whether the same address information and service information have been received by checking the address information and the service information recorded in the DAD packet. For this, the controller 220 can look up information in the routing table stored in the memory 240. Upon determining that at least one of the address information and the service information is novel, the controller 220 controls the packet processor 230 to generate a registration request packet. The packet processor 230 can generate the registration request packet by converting the DAD packet in conformity to a protocol of the infrastructure network 100. The controller 220 transmits the generated registration request packet to the service repository 110 over the infrastructure network 100. The service repository 110 records the address and service information of the new mobile node to its lookup table. Detailed description of the formats of the DAD packet and the registration request packet are provided further below.

A first mobile node among the mobile nodes of the ad-hoc network 300 can broadcast a SREQ packet to request a first service over the ad-hoc network 300. The communication section 210 receiving the SREQ packet notifies the controller 220 of the SREQ packet.

The controller 220 controls the packet processor 230 to update the SREQ packet. In specific, the packet processor 230 converts the SREQ packet using the protocol of the infrastructure network 100. For example, a service location protocol (SLP) can be adapted, explained in greater detail below.

The controller 220 controls the communication section 210 to transmit the converted packet to the service repository 110 over the infrastructure network 100. The service repository 110 determines whether a service provider of the first service exists by referencing the lookup table. Upon discovering the service provider, the service repository 110 transmits a SREP packet containing the address information of the discovered service provider.

Upon the reception of the SREP packet, the communication section 210 notifies the controller 220 of the SREP packet reception. The controller 220 controls the packet processor 230 to update the SREP packet using a protocol of the ad-hoc network 300. Next, the controller 220 controls the communication section 210 to transmit the updated SREP packet to the first mobile node.

The controller 220, when the SREQ packet is received, first controls the search section 250 to search a service provider providing the first service in the ad-hoc network 300. When the service provider is discovered, the SREQ packet is forwarded to the discovered service provider rather than the service repository 110. Upon receiving the SREQ packet, the service provider transmits a SREP packet to the first mobile node.

Each mobile node in the ad-hoc network 300 periodically transmits an information request packet to maintain its communication link to the gateway 200. When the information request packet is received, the communication section 210 notifies the controller 220 of the packet reception. The controller 220 determines whether the information request packet contains the update information of the service. When the update information is contained, the controller 220 notifies the service repository 110 of the update information so as to update the lookup table of the service repository 110.

In case that the communication section 210 receives a SREQ packet from a terminal device in the infrastructure network 100, the controller 220 can update the SREQ packet using the protocol of the ad-hoc network 300 and broadcast the updated packet over the ad-hoc network 300. Alternatively, when the routing table stored in memory 240 holds information relating to a mobile node that provides the service requested by the terminal device, the controller 220 can transmit the converted SREQ packet to the mobile node.

Figure 4:
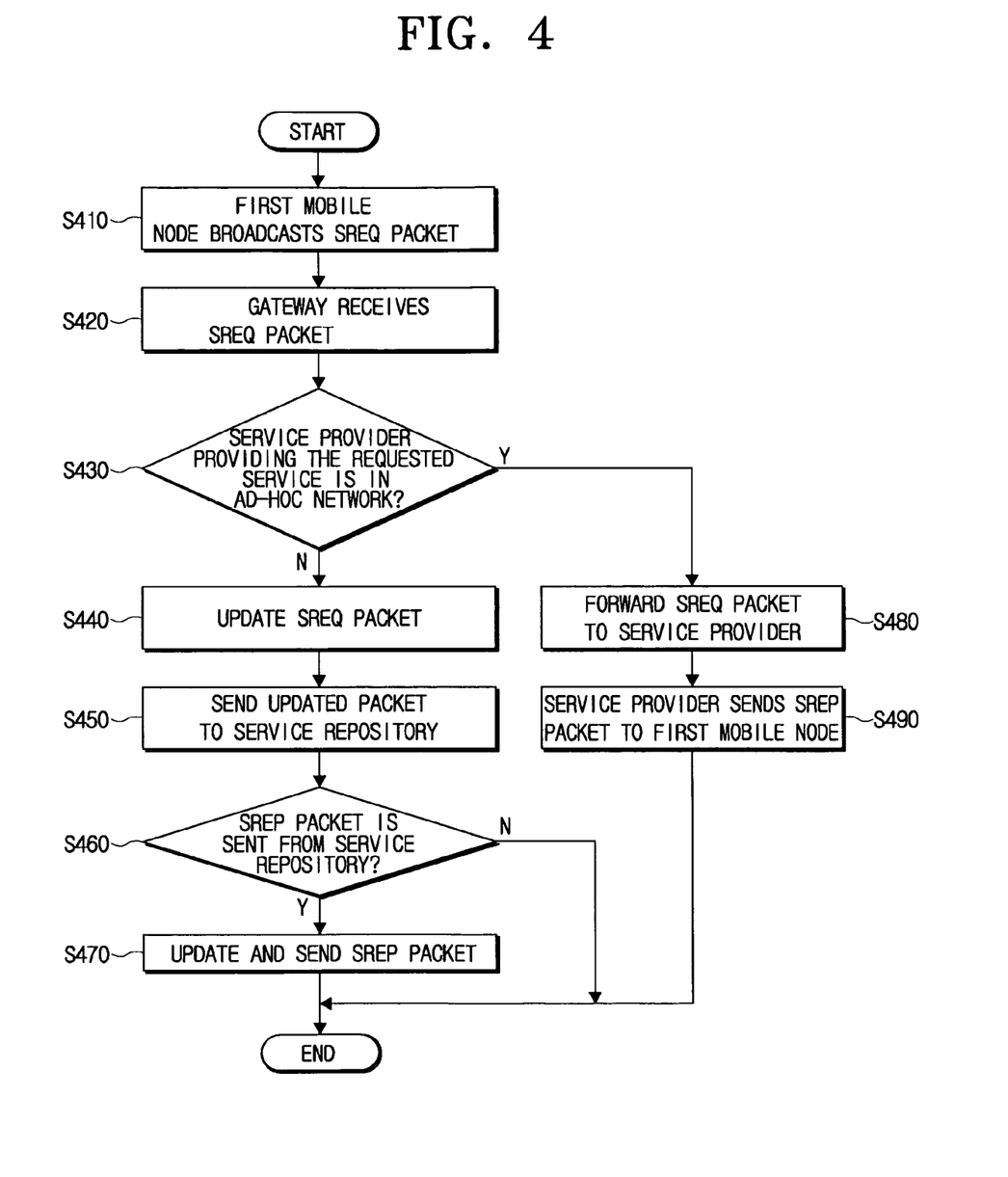
FIG. 4 is a flowchart illustrating a service provider discovery method in the wireless network environment according to an exemplary embodiment of the present invention.

FIG. 4 is a flowchart explaining a service provider discovery method according to an exemplary embodiment of the present invention. Referring to FIG. 4, when a first mobile node, which belongs to the ad-hoc network 300 in the wireless network environment, broadcasts a SREQ packet to request a first service (S410), the gateway 200 receives the SREQ packet (S420). The gateway 200 determines whether a service provider providing the first service resides in the ad-hoc network 300 (S430).

When the service provider is in the ad-hoc network 300, the gateway 200 forwards the SREQ packet to the service provider (S480). The service provider transmits a SREP packet containing its address information to the first mobile node (S490).

By contrast, when the service provider is not present in the ad-hoc network 300, the service provider updates the SREQ packet using the protocol of the infrastructure network 100 (S440). The updated packet is transmitted to the service repository 110 (S450).

If the service repository 110 transmits a SREP packet in response to the SREQ packet (S460), the gateway 200 updates and transmits the SREP packet to the first mobile node (S470); otherwise the process ends.

Figure 5:
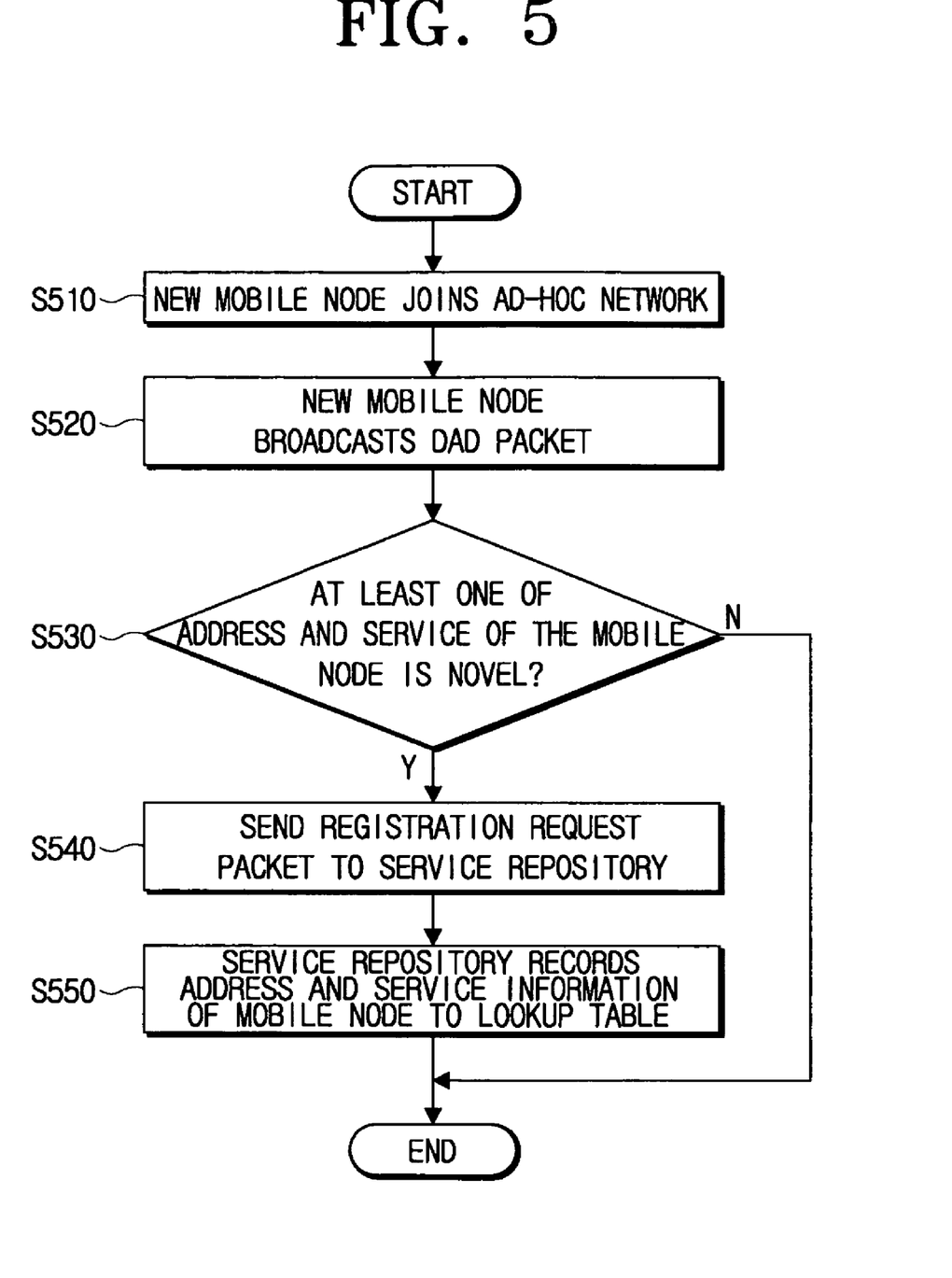
FIG. 5 is a flowchart illustrating a service provider registration method in the wireless network environment according to an exemplary embodiment of the present invention.

FIG. 5 is a flowchart explaining a service provider registration method according to an exemplary embodiment of the present invention. Referring to FIG. 5, when a new mobile node joins the ad-hoc network 300 (S510), the new mobile node broadcasts a DAD packet to perform the DAD (S520). The service information of the new mobile node is recorded in the DAD packet in addition to the address information.

Upon receiving the DAD packet, the gateway 200 determines whether at least one of the address information and the service information of the new mobile node is novel (S530). At this time, the gateway 200 makes the new mobile node recognize its address information by transmitting a gateway advertisement packet to the new mobile node.

When the gateway 200 determines that at least one of the address information and the service information is novel, the gateway 200 updates and transmits a registration request packet to the service repository 110 (S540). The service repository 110 registers the new service provider by recording the address information and the service information, which are contained in the received registration request packet, to its lookup table (S550).

Figure 6:
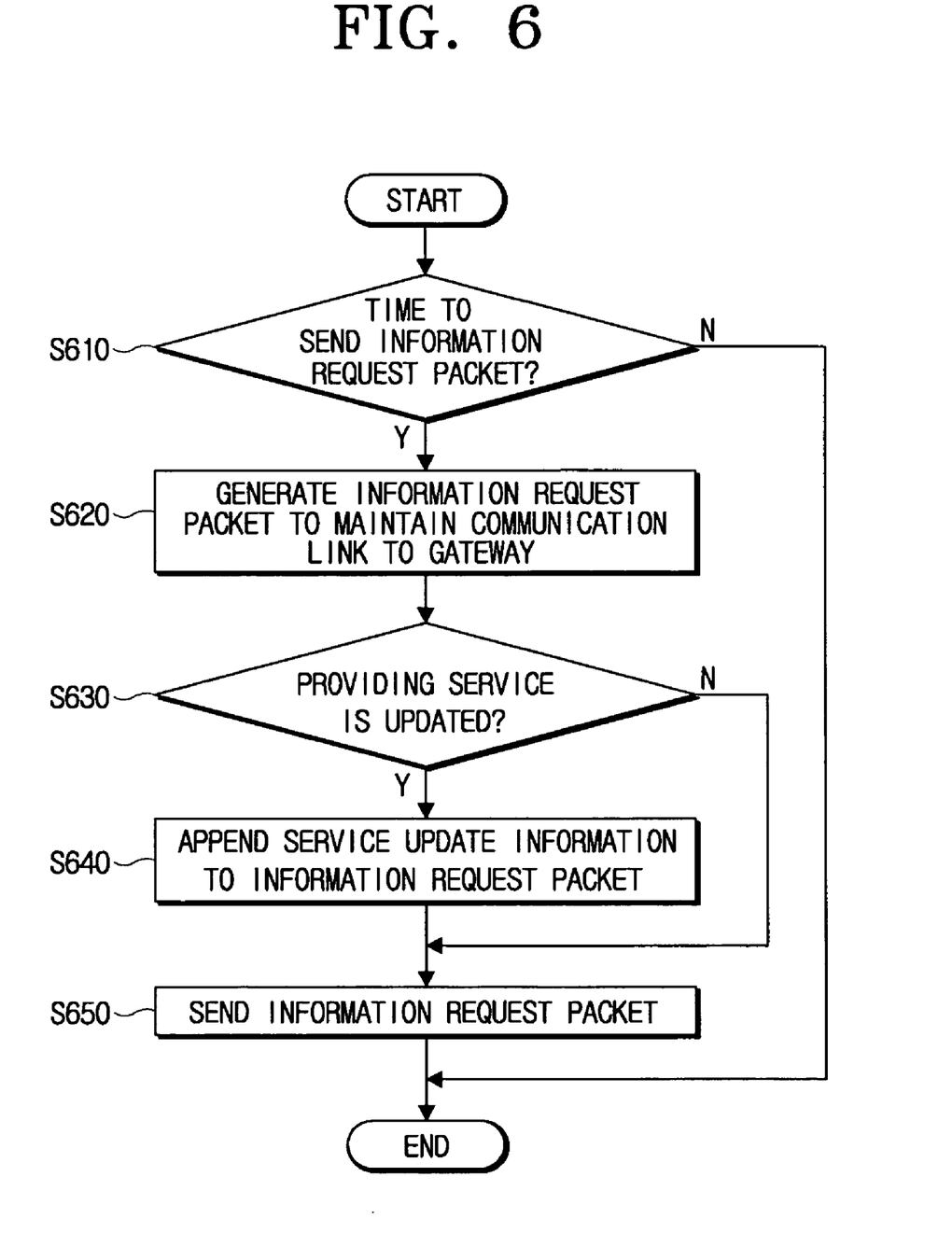
FIG. 6 is a flowchart illustrating a service provider update method in the wireless network environment according to an exemplary embodiment of the present invention.

FIG. 6 is a flowchart explaining how a mobile node in the ad-hoc network 300 notifies its service update using the information request packet. Referring to FIG. 6, the mobile node determines whether a preset time has come (S610). When the present time has come, the mobile node generates an information request packet to maintain the communication link with the gateway 200 (S620). When its service is updated (S630), the mobile node appends its service update information to the information request packet (S640) and transmits the information request packet to the gateway 200 (S650). The mobile node compares a version number or a patch number of an execution program that performs its service with an existing number, and determines that its service is updated when the compared numbers are different from each other. Alternatively, the mobile node may determine update of its service by checking whether user established functions regarding the service are added or deleted.

The gateway 200 maintains the communication link with the mobile node using the information request packet, and transmits the service update information to the service repository 110 so as to update the lookup table.

Figure 7A:
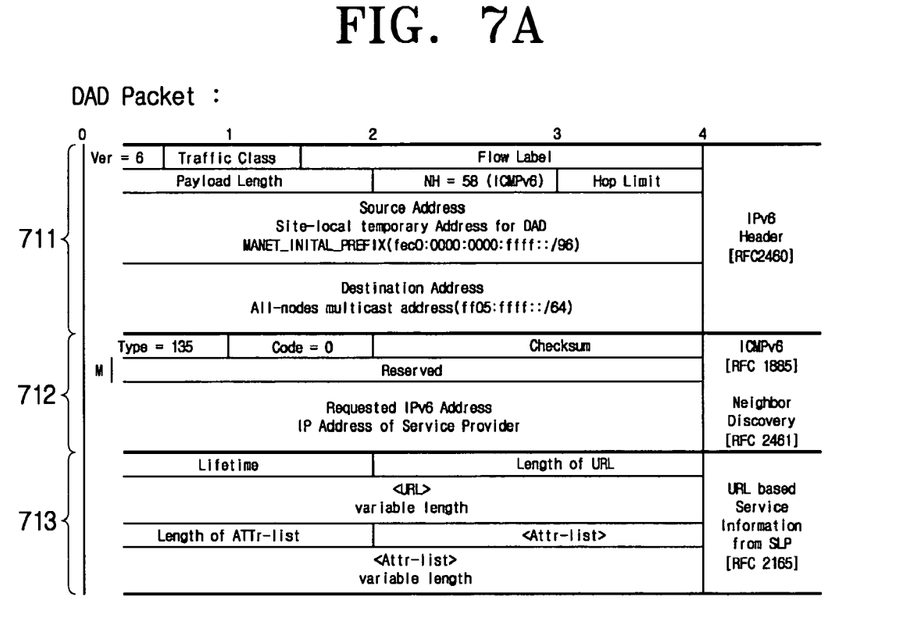
FIGS. 7A and 7B illustrate formats of a registration request packet for registering the service provider according to an exemplary embodiment of the present invention.
Figure 7B:
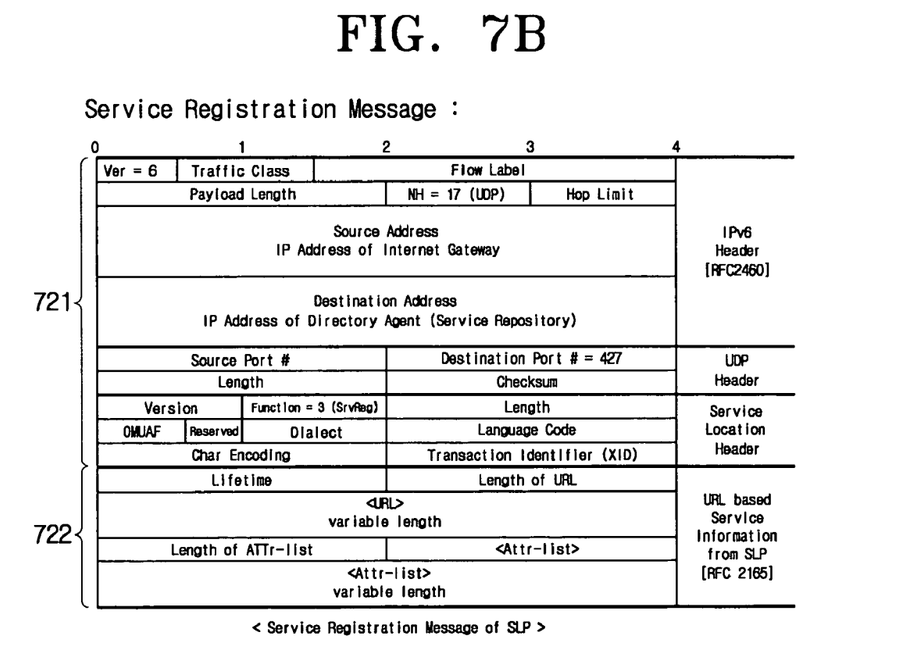

FIGS. 7A and 7B illustrate formats of a DAD packet and a registration request packet, respectively, used in the wireless network environment according to exemplary an embodiment of the present invention. FIG. 7A depicts the format of the DAD packet transmitted from a new mobile node to the gateway 200. Referring to FIG. 7A, a header 711 of the DAD packet contains a source address and a destination address according to Internet protocol version 6 (IPv6). The source address is the address of the new mobile node, and the destination address is an all-nodes multicast address. Hence, the DAD packet can be broadcast throughout the ad-hoc network.

A packet body is divided into a region 712 requesting to check whether there is a node having a duplicate address among neighbor nodes, and a region 713 recording its service information. The DAD request region 712 can be recorded according to Internet Control Message Protocol version 6 (ICMPv6). The service information recording region 713 can record URL information, characteristic information of the service, and so on.

FIG. 7B depicts the format of the registration request packet transmitted from the gateway 200 to the service repository 110 according to the SLP. Referring to FIG. 7B, the registration request packet is divided into a header 721 and a body 722. The header 721 includes a region recording a source address and a destination address according to the IPv6, a user datagram protocol (UDP) header region, and a service location header region to inform the location of the service provider. The header 721 is in conformity with the well-known SLP, and thus is not explained in further detail. The body 722 records service information received from the new mobile node. In more detail, the service information recorded in the DAD packet is recorded in the body of the registration request packet.

Figure 8A:
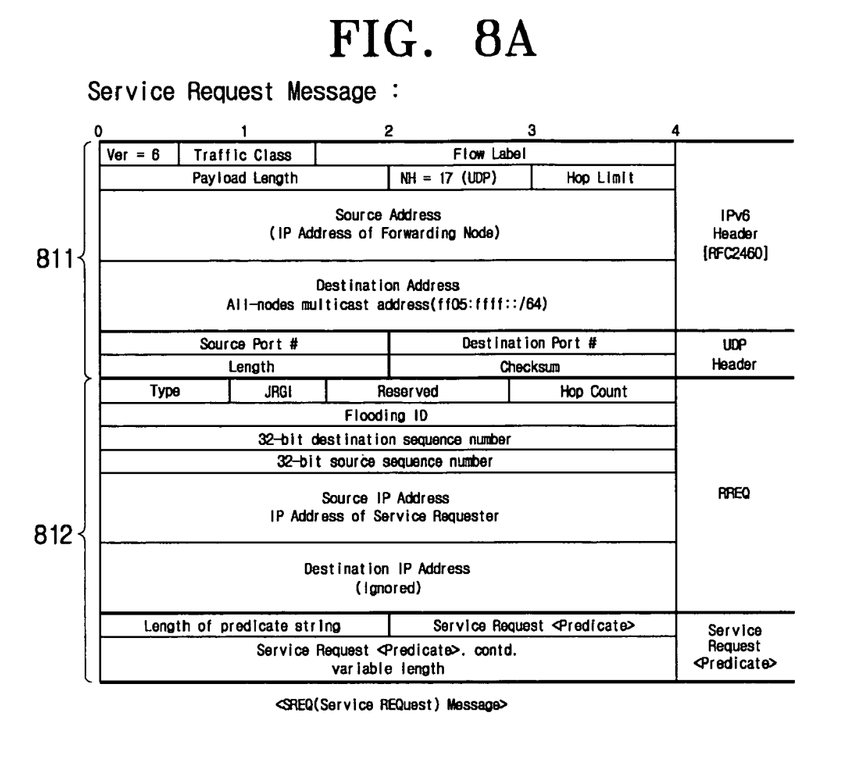
FIGS. 8A and 8B illustrate formats of a service request (SREQ) packet transmitted by a service requester for a service request according to an exemplary embodiment of the present invention.
Figure 8B:
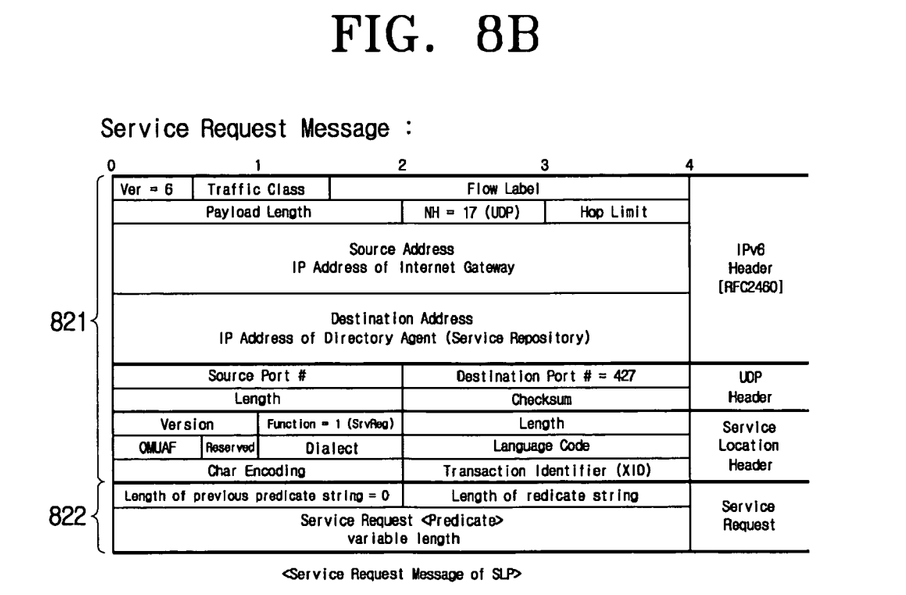

FIGS. 8A and 8B illustrate formats of a service request packet according to an exemplary embodiment of the present invention. In particular, FIG. 8A depicts a format of a first service packet transmitted from a mobile node of the ad-hoc network 300 to the gateway 200. A header 811 includes an IPv6 header region and an UDP header region. The IPv6 header region contains a source address and a destination address. The UDP header contains port numbers of the source and the destination, a packet length, and a checksum. A packet body 812 includes a route request (RREQ) region containing address information of a service requester to establish a route, and a service request region for requesting a specific service. The gateway 200 can convert the first service request packet to a second service request packet using the SLP.

FIG. 8B depicts a format of the second service request packet which is converted from the first service request packet using the SLP by the gateway 200. Referring to FIG. 8B, a header 821 of the second service request packet includes an IPv6 header, an UDP header, and a service location header. A body 822 of the second service request packet contains the service information that has been recorded in the first service request packet.

Figure 9A:
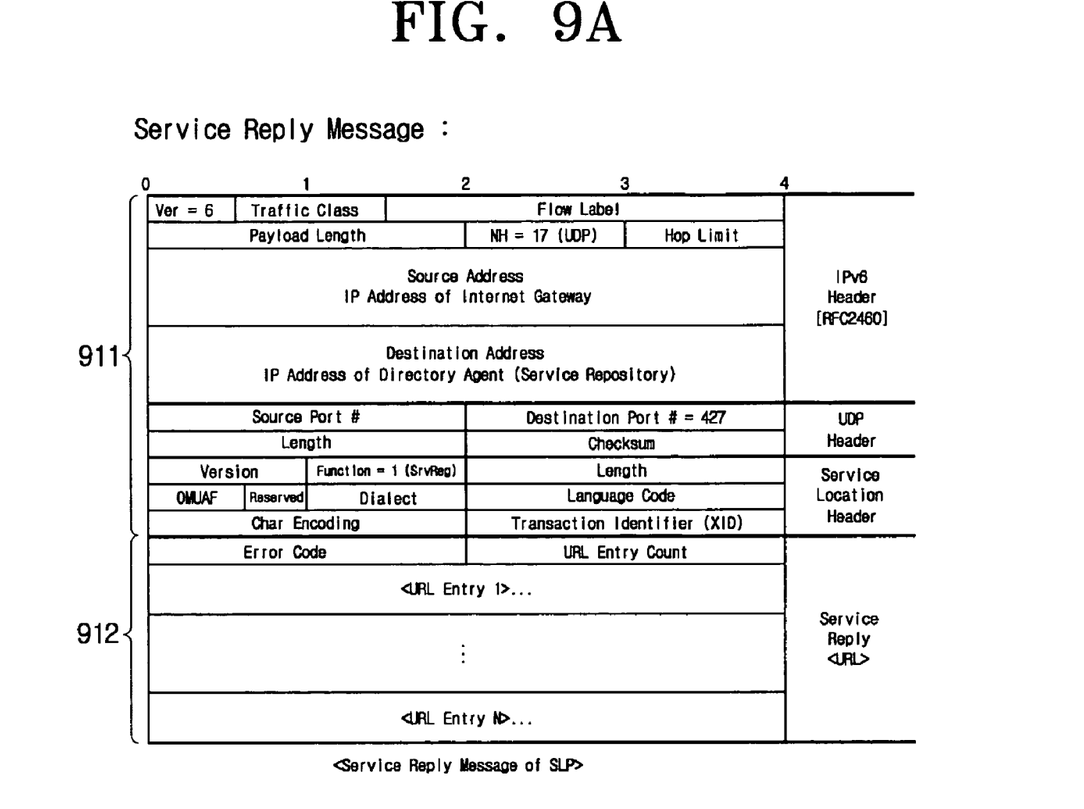
FIGS. 9A and 9B illustrate formats of a service reply (SREP) packet in response to the SREQ packet according to an exemplary embodiment of the present invention.
Figure 9B:
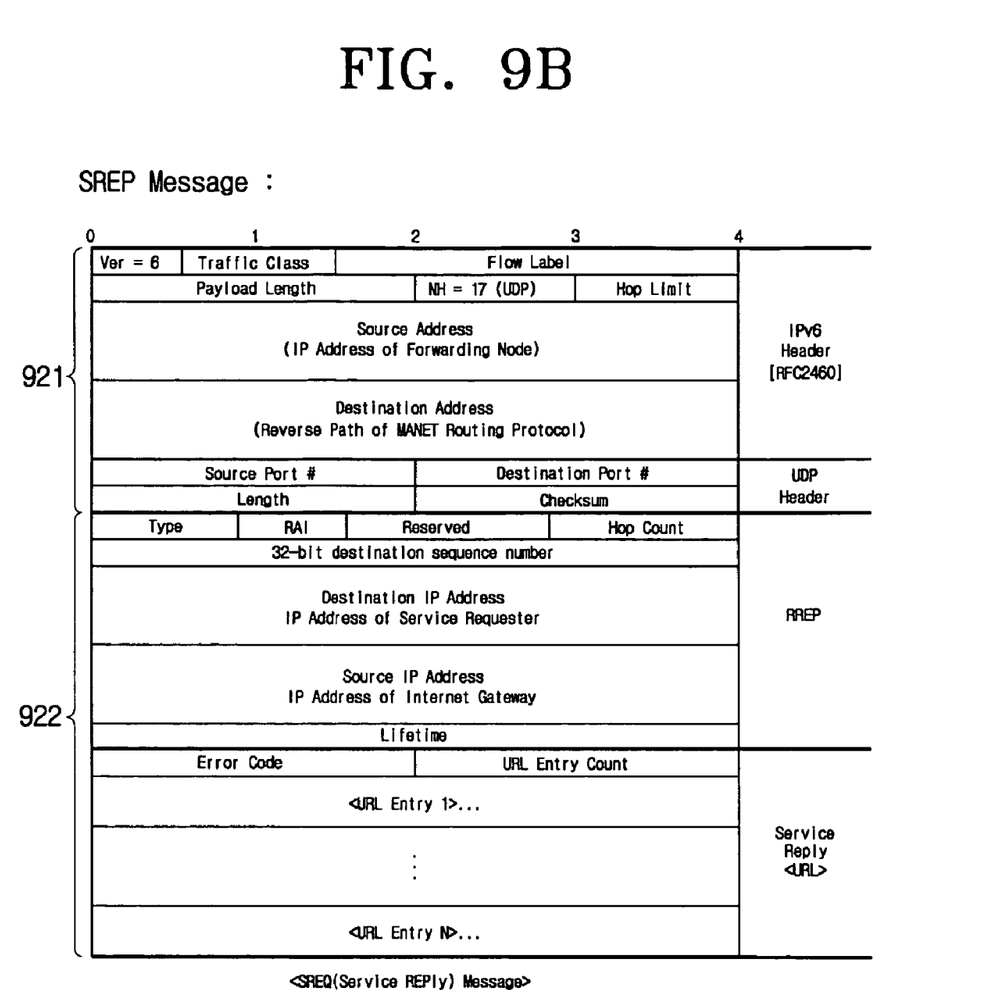

FIGS. 9A and 9B illustrate formats of a SREP packet according to an exemplary embodiment of the present invention. FIG. 9A depicts a format of a first SREP packet generated by the service repository 110 according to the SLP. As shown in FIG. 9A, a header 911 of the first SREP packet includes an IPv6 header, a UDP header, and a service location header. A body 912 contains information relating to the service provider of the service requested by the SREQ packet. In FIG. 9A, the URL information list of the service provider is recorded in the body 912.

FIG. 9B depicts a format of a second SREP packet that is converted from the first SREP packet by the gateway 200 according to the protocol of the ad-hoc network 300. Referring to FIG. 9B, a header 921 of the second SREP packet includes an IPv6 header and a UDP header. A body 922 of the second SREP packet includes a route reply (RREP) region containing IP addresses of the destination and the source in response to the RREQ, and a service reply region containing service provider information. The service requester can access the service provider of the intended service using the URL recorded in the service reply region.

As set forth above, exemplary embodiments of the present invention can discover a service provider in association with the ad-hoc network and the infrastructure network. Thus, a user can enjoy the service of the service provider which operates in a different communication mode without having to change the communication mode of the terminal devices. Therefore, usability of the terminal devices can be enhanced. Furthermore, since whether to update the service can be dynamically controlled based on the frequency of the service use, the stability of the link, and the like, the communication overhead can be alleviated.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is given by the appended claims, rather than the preceding description, and all variations and equivalents which fall within the range of the claims are intended to be embraced therein.

What is claimed is:

1. A service provider discovery method in a wireless network environment comprising an infrastructure network, an ad-hoc network, and a gateway connecting the networks, the method comprising:
   receiving, by the gateway, a service request (SREQ) packet which is broadcasted from a first mobile node in the ad-hoc network;
   updating and transmitting, by the gateway, the SREQ packet to a service repository which stores at least one service provider information, in the infrastructure network;
   transmitting, by the service repository, to the gateway a service reply (SREP) packet comprising information relating to a service provider that provides a service requested by the SREQ packet;
   updating and transmitting, by the gateway, the SREP packet to the first mobile node; and
   joining, by a second mobile node providing another service, the ad-hoc network;
   generating, by the second mobile node, a duplicate address detection (DAD) packet comprising information describing said another service and transmitting the DAD packet to the gateway;
   checking, by the gateway, whether an address and the information describing said another service of the second mobile node are novel;
   transmitting, by the gateway, a registration request packet, in which the address and the information describing said another service of the second mobile node are recorded, to the service repository when at least one of the address and the information describing said another service of the second mobile node is novel; and
   registering, by the service repository, the information describing the second mobile node and said another service to a lookup table that stores the service provider information.

2. The service provider discovery method of claim 1, further comprising:
   generating, by each mobile node in the ad-hoc network, an information request packet to maintain a communication link to the gateway;
   recording, by each mobile node, to the information request packet update information describing a service provided by the each mobile node;
   transmitting the information request packet to the gateway in a cycle;
   transmitting, by the gateway, to the service repository the update information recorded in the information request packet received from each mobile node; and
   updating, by the service repository, the lookup table using the update information.

3. The service provider discovery method of claim 2, further comprising:
   setting the transmission cycle of the information request packet in inverse proportion to a frequency of service use provided from each mobile node and in proportion to a communication link stability of each mobile node.

4. The service provider discovery method of claim 1, further comprising:
   defining, by the first mobile node, a maximum broadcast range to be a communication distance to the gateway and broadcasting the SREQ packet within the maximum broadcast range.

5. The service provider discovery method of claim 1, further comprising:
   searching, by the gateway, a second mobile node which provides the service requested by the SREQ packet in the ad-hoc network;
   transmitting the SREQ packet to the second mobile node when the second mobile node is discovered; and
   transmitting, by the second mobile node, a SREP packet to the first mobile node.

6. The service provider discovery method of claim 1, further comprising:
   broadcasting, by the gateway, a SREQ packet requesting a first service throughout the ad-hoc network when the first service is requested from a terminal device in the infrastructure network.

7. The service provider discovery method of claim 1, further comprising:
   searching, by the gateway, a service provider that provides a first service in the ad-hoc network when the first service is requested from a terminal device in the infrastructure network.

8. A service provider registration method of a service repository that stores a lookup table having information of at least one service provider information, in an infrastructure network connected to an ad-hoc network through a gateway, the method comprising:
   joining, by a mobile node providing a service, the ad-hoc network;
   generating, by the mobile node, a duplicate address detection (DAD) packet comprising information describing the service and transmitting the DAD packet to the gateway;
   checking, by the gateway, whether an address and the information describing the service of the mobile node are novel;
   transmitting, by the gateway, a registration request packet in which the address and the information describing the service of the mobile node are recorded, to the service repository if at least one of the address and the information describing the service of the mobile node is novel; and
   registering, by the service repository, the information describing the service of the mobile node and the service to the lookup table.

9. The service provider registration method of claim 8, further comprising:
- transmitting in a cycle, by each mobile node in the ad-hoc network, to the gateway an information request packet having update information describing a service provided by each mobile node;
- transmitting, by the gateway, the update information to the service repository; and
- updating, by the service repository, the lookup table using the update information.

10. A gateway which interconnects an ad-hoc network and an infrastructure network, comprising:
- a memory storing a routing table having communication path information with respect to each mobile node in the ad-hoc network and service information, which describes a service provided by each mobile node, provided from each mobile node;
- a communication section receiving a service request packet (SREQ) packet from a first mobile node in the ad-hoc network;
- a search section discovering a service provider which provides a service requested by the SREQ packet, in the ad-hoc network using the routing table;
- a packet processor updating the SREQ packet according to a protocol used in the infrastructure network; and
- a controller controlling the communication section to transmit the packet converted by the packet processor to a service repository in the infrastructure network when a determination is made that the service provider is not in the ad-hoc network,
- wherein the controller, if a service reply packet (SREP) packet is received from the service repository, controls the packet processor and the communication section to update the SREP packet according to a protocol used in the ad-hoc network and to transmit the updated packet to the first mobile node,
- wherein the controller, if the search section discovers the service provider, forwards the SREQ packet to the service provider,
- wherein the controller, if a duplicate address detection (DAD) packet in which address information and service information are recorded is received from a second mobile node joining the ad-hoc network, checks whether an address and the information describing said another service of the second mobile node are novel, and registers the second mobile node to the service repository by controlling the communication section to transmit to the service repository a registration request packet in which the address information and the service information are recorded when at least one of the address and the information describing said another service of the second mobile node is novel.

11. The gateway of claim 10, wherein the controller, each time an information request packet to which update information relating to a service provided from each mobile node is appended is received from each mobile node in the ad-hoc network, controls the communication section to transmit to the service repository a packet in which the update information is recorded.

12. The gateway of claim 10, wherein the controller, if a SREQ packet is received from a terminal device in the infrastructure network, controls the packet processor and the communication section to update the SREQ packet and to broadcast the updated packet throughout the ad-hoc network.

13. The gateway of claim 10, wherein the controller, if a SREQ packet is received from a terminal device in the infrastructure network, controls the packet processor and the communication section to update the SREQ packet and to forward the updated packet to the discovered service provider.

14. A service provider discovery method in a wireless network environment comprising an infrastructure network, an ad-hoc network, and a gateway connecting the networks, the method comprising:
- receiving, by the gateway, a service request (SREQ) packet which is broadcasted from a first mobile node in the ad-hoc network;
- updating and transmitting, by the gateway, the SREQ packet to a service repository which stores at least one service provider information, in the infrastructure network;
- receiving, by the gateway, a service reply (SREP) packet comprising information relating to a service provider that provides a service requested by the SREQ packet;
- updating and transmitting, by the gateway, the SREP packet to the first mobile node; and
- receiving, by the gateway, a duplicate address detection (DAD) packet broadcasted by a second mobile node comprising information describing another service provided by the second mobile node; and
- checking, by the gateway, whether an address and the information describing said another service of the second mobile node are novel.

15. The service provider discovery method of claim 14, further comprising:
- transmitting, by the gateway, a registration request packet, in which the address and the information describing said another service of the second mobile node are recorded, to the service repository when at least one of the address and the information describing said another service of the second mobile node is novel.

16. The service provider discovery method of claim 15, further comprising:
- receiving, by the gateway, an information request packet from each mobile node in the ad-hoc network;
- wherein the information request packet comprises update information describing a service provided by the mobile node from which the information request packet was received.

17. The service provider discovery method of claim 16, further comprising:
- transmitting, by the gateway, to the service repository the update information recorded in the information request packet received from each mobile node.

18. The service provider discovery method of claim 16, wherein the gateway receives the information request packet according to a receiving cycle.

19. The service provider discovery method of claim 16, further comprising:
- setting, by the gateway, the receiving cycle of the information request packet in inverse proportion to a frequency of service use provided from each mobile node and in proportion to a communication link stability of each mobile node.

* * * * *